(12) United States Patent
Francois

(10) Patent No.: US 6,399,176 B1
(45) Date of Patent: Jun. 4, 2002

(54) COMPOSITE WEAR COMPONENT

(75) Inventor: Hubert Francois, Ans (BE)

(73) Assignee: Magotteaux International S.A., Vaux-Sous-Chevremont (BE)

( * ) Notice: Subject to any disclaimer, the term of this patent is extended or adjusted under 35 U.S.C. 154(b) by 0 days.

(21) Appl. No.: 09/269,723

(22) PCT Filed: Aug. 27, 1997

(86) PCT No.: PCT/EP97/04762
§ 371 (c)(1),
(2), (4) Date: Jun. 1, 1999

(87) PCT Pub. No.: WO98/15373
PCT Pub. Date: Apr. 16, 1998

(30) Foreign Application Priority Data

Oct. 1, 1996 (EP) .............................................. 96202741
Jul. 4, 1997 (EP) .............................................. 97870099

(51) Int. Cl.$^7$ ................................ B24D 3/34; F16J 9/00
(52) U.S. Cl. ...................... 428/67; 428/539.5; 428/545; 428/610; 428/614; 428/615; 428/457; 428/702; 428/472; 92/129; 51/307
(58) Field of Search ............................. 428/539.5, 545, 428/610, 702; 164/4.1, 97, 107, 108; 51/293, 309, 295, 307; 501/127, 128, 132; 264/653, 603

(56) References Cited

U.S. PATENT DOCUMENTS 3,181,939 A     5/1965   Marshall et al. ............... 51/309
4,997,461 A  *  3/1991   Markhoff-Matheny et al. ............................ 51/295
5,551,963 A  *  9/1996   Larmie ......................... 51/307

FOREIGN PATENT DOCUMENTS

DE   702385      2/1941
DE   1949777     10/1970
DE   7326661   * 11/1973   ............ B22D/19/02
DE   2335588     3/1975
EP   0476496     3/1992
EP   0575685     12/1993
JP   62286661  *  4/1986   ............ B22D/19/08

OTHER PUBLICATIONS

Patent Abstracts of Japan, vol. 12, No. 171, May 21, 1988 and JP62286661A (Kawasaki Heavy Ind. Ltd.), Dec. 12, 1987.
Patent Abstracts of Japan, vol. 17, No. 635, Nov. 25, 1993 and JP05200526 (Mitsubishi Heavy Ind. Ltd.), Aug. 10, 1993.
Patent Abstracts of Japan, vol. 9, No. 286, Nov. 13, 1985 and JP60127067 (Kubota Tekko KK), Jul. 6, 1985.
Patent Abstracts of Japan, vol. 12, No. 73, Mar. 8, 1988 and JP62214863 (Nippon Chuzo KK), Sep. 21, 1987.
Patent Abstracts of Japan, vol. 14, No. 469, Oct. 12, 1999 and JP02187250 (Kurimoto Ltd.), Jul. 23, 1990.
W. Gerhartz et al, Ullmann's Encyclopedia of Industrial Chemistry, Weinheim, Fifth Edition XP002023826, vol. A, p. 6.

* cited by examiner

Primary Examiner—Harold Pyon
Assistant Examiner—Shalie A. Manlove
(74) Attorney, Agent, or Firm—Jacobson Holman, PLLC

(57) ABSTRACT

Composite wear component produced by casting and consisting of a metal matrix whose working face or faces include inserts which have a very high wear resistance, characterized in that the inserts consist of a ceramic pad, this ceramic pad consisting of a homogeneous solid solution of 20 to 80% of $Al_2O_3$ and 80 to 20% of $ZrO_2$, the percentages being expressed by weights of the constituents, and the pad then being impregnated with a liquid metal during the casting.

11 Claims, 1 Drawing Sheet

COMPOSITE WEAR COMPONENT

SUBJECT OF THE INVENTION

The present invention relates to a composite wear component produced by casting and consisting of a metal matrix whose wear face comprises inserts which have good wear resistance properties.

TECHNOLOGICAL BACKGROUND UNDERLYING THE INVENTION

The invention relates especially to wear components employed in plants for grinding, crushing and conveying various abrasive materials which are encountered in industries such as cement factories, mines, metallurgy, electricity generating stations or various quarries. These components are often subjected to high mechanical stresses in the bulk and to a high wear by abrasion at the working face. It is therefore desirable that these components should exhibit a high abrasion resistance and some ductility, to be able to withstand the mechanical stresses such as impacts and to be capable optionally of being machined.

Given that these two properties are difficult to reconcile with one another in the same material, composite components have already been proposed which have a core made of relatively ductile alloy in which isolated inserts which have a good wear resistance are embedded.

Document EP-A-0476496 proposes this technique for the production of grinding wheels whose working face has set-in inserts made of chrome pig iron.

Since it is known that ceramic materials have good abrasion resistance properties, it is also known to employ these materials for improving the abrasion resistance of wear components.

Document EP-A-0575685 proposes the use of ceramic materials in a moulding by lost-wax precision casting of small wear components.

This well-known process employs wax models which must be melted to obtain the mould cavity which must be filled with metal; this mould itself is made of ceramic and not of a conventional sand.

According to this document a ceramic pad (wafer core) is formed first, with a spongy structure which has a three-dimensional network of open pores all of which communicate with one another. This ceramic pad is formed by pouring grains of ceramic materials into an appropriate mould and, next, a liquid adhesive with a good fluidity, for example a liquid resin which, after curing, retains the grains to form the ceramic structure. The ceramic material may consist of aluminium oxide or of zirconium oxide. After having been pre-impregnated with wax, this pad is placed in a mould intended to produce the wax model of the component. The wax model is then cast and, lastly, the ceramic mould is produced by dipping the wax model in a ceramic slurry. The ceramic mould containing the wax model is then heated so as to melt the wax model. The wax thus flows from the ceramic mould but the pads inserted beforehand in the wax model remain adhesively bonded to the walls of the ceramic mould.

For the casting of metal in the ceramic mould the latter is preheated to a temperature of the order of 1150° C., generally under vacuum.

This known technique is limited, however, to lost-wax precision moulding. Moreover, the compatibility between the metal matrix and the ceramic structure, especially in terms of temperature behaviour, presents hardly any problems in the case of the applications mentioned in this document, given that, when the metal is being cast, the mould and the ceramic structure are preheated to a high temperature. In addition, the technique is limited to the production of very precise special components, which are sold at a very high price because the lost-wax moulding process itself is very costly.

The document "Ullmann's Encyclopedia of Industrial Chemistry" (1985), W. Gerhartz, VCH Verslagsgesellschaft, 5$^{th}$ Edition XP002023826, page 5 mentions compositions based on $Al_2O_3$-$ZrO_2$ for grinding devices intended for conditioning cast products (billets and slabs).

PROBLEMS UNDERLYING THE INVENTION

The technique described above cannot as such be adapted to the manufacture of wear components of larger dimensions for applications such as those encountered in plants for grinding, crushing or conveying abrasive materials, where the components generally have sections of at least 25 mm and often larger than 40 mm.

In addition, in accordance with the technique of the present invention it is not possible to cast, or at least it is difficult to envisage casting, components with thin sections, for example of less than 25 mm, because neither the mould nor the ceramic insert is preheated to high temperature before the metal is cast.

Furthermore, the component usually undergoes a subsequent heat treatment. There must therefore be some compatibility from the viewpoint of temperature behaviour between the ceramic material and the metal, to avoid cracking due to the thermal shocks when liquid metal is being cast over the ceramic inserts, and those that can be produced during the subsequent heat treatment and caused by the different expansion coefficients of both these materials.

It is necessary, furthermore, that the mechanical properties of the ceramic material should be adapted to those of the metal in order to produce a component whose properties correspond to the requirements of the specific application for which it is intended.

The aim of the present invention is to provide a composite wear component with ceramic inserts satisfactorily corresponding to the requirements listed above.

A second problem arises from the fact that, above a thickness of 25 mm of the ceramic material, poor infiltration of the metal is observed. Another objective of the present invention is to solve this second problem by proposing specific geometries of the composite wear component.

MAIN CHARACTERISTIC ELEMENTS OF THE INVENTION

To meet the first objective the invention proposes a composite wear component produced by conventional or centrifugal casting. It consists of a metal matrix whose wear surface comprises inserts which have good abrasion resistance properties, these inserts being made of a ceramic material, itself composite, consisting of a solid solution or homogeneous phase of 20 to 80% of $Al_2O_3$ and 80 to 20% of $ZrO_2$, the percentages being expressed by weights of constituents.

The ceramic material may additionally contain other oxides whose proportion by weight does not exceed 3 to 4%.

According to a first preferred embodiment of the present invention the composition of the ceramic material is the following:

55–60% by weight of $Al_2O_3$, and

38–42% by weight of $ZrO_2$.

According to another preferred embodiment the composition of the ceramic material is the following:

70–77% by weight of $Al_2O_3$, and

23–27% by weight of $ZrO_2$.

The content of ceramic materials in the insert is between 35 and 80% by weight, preferably between 40 and 60% and advantageously of the order of 50%.

This composite ceramic material is produced from an aggregate of ceramic grains which have a particle size within the range F6 to F22 according to the FEPA standard, that is to say a diameter of between approximately 0.7 mm and 5.5 mm. These ceramic grains are manufactured in a conventional way, by electrofusion, by sintering, by flame spraying or by any other process allowing the two constituents to fuse.

The ceramic grains are aggregated with the aid of an adhesive, the proportion of which does not exceed 4% by weight relative to the total weight of the pad and is preferably between 2 and 3% by weight. This adhesive may be inorganic or organic. An adhesive based on a silicate or an adhesive which is in the form of epoxy resin may be mentioned by way of example.

The invention is based on the finding that aluminium oxide (corundum) and zirconium oxide have relatively different properties and this makes it possible, by a judicious choice within the abovementioned ranges, to adjust the hardness, the toughness and the thermal expansion coefficient of the ceramic composite so as to combine a good hardness and a good toughness; and to make it compatible with the precise application for which the component is intended, on the one hand, and to obtain, on the other hand, an expansion coefficient of the composite ceramic which is close to that of the casting metal chosen, that is to say of the pig iron or of the steel which has an expansion coefficient of between $10 \times 10^{-6}$ and $11 \times 10^{-6}$.

Zirconium oxide has the advantage of having an expansion coefficient which is close to that of the metal. In addition, it contributes to good toughness, that is to say that it reduces the risks of breakage.

Aluminium oxide, for its part, contributes to good hardness. Within the pads the zirconium particles present in the alumina make it possible to increase the resistance of the latter to cracking and thus to obtain a toughness greater than that of each of the components considered in isolation, namely $ZrO_2$ or $Al_2O_3$.

In other words, in the wear components which are subjected to strong abrasion it is advantageous to increase the proportion of aluminium oxide, not exceeding, however, a certain limit beyond which the abrasion resistance and the toughness begin to decrease. In this case the second range is rather chosen for the ceramic composition.

On the other hand, in the case of the components which are subjected to considerable impacts or to high pressures, it is advantageous to give preference to the expansion coefficient at the expense of hardness and to increase the proportion of zirconium oxide in order to decrease the stresses in the component and, consequently, the risks of breakage.

In the case of the components where there is a risk of cracking during the casting or during the subsequent heat treatment it is also advantageous to increase the proportion of zirconium oxide, to bring the expansion coefficient of the insert nearer to that of the metal matrix.

The choice of the proportions of the constituents of the composite ceramic insert may, of course, also take into account the composition of the casting metal with a view to the properties required by the application for which the component is intended. Similarly, the choice of the composition of the casting metal may be adapted to the nature of the composite insert.

Various geometries are proposed within the scope of the present invention in order to solve the problem of the poor infiltration of the liquid metal within the ceramic phase.

In the particular case where the thickness of the pad made of ceramic material becomes considerable, two or more superposed pads made of ceramic material will be proposed, according to a first embodiment, these being kept separated by a minimum gap of the order of 10 mm in order to permit the arrival of the liquid metal. This makes it possible thus to obtain correct infiltration of the various pads. In this way an appreciable increase in the proportion of the ceramic phase within the insert is obtained without being confronted with the problem of the poor infiltration by the metal.

According to another embodiment it will be proposed to produce the pad rather in the form of a "honeycomb" structure which includes various elementary cells exhibiting a polygonal or circular shape within the ceramic phase. The thickness of the walls of the various cells constituting the ceramic phase preferably varies between 5 and 25 mm.

Once again, this embodiment makes it possible to increase the quantity of the ceramic phase without, however, risking the problem of poor infiltration of the liquid metal in the case of a component whose wear takes place more particularly in depth.

Once again, the advantage lies in the fact that the walls do not exceed the limiting thickness for infiltration of the liquid metal, which is approximately 25 mm, but with a height that is practically equal to the height of the composite component. In addition, on proposing this second embodiment of the pad in the "honeycomb" form, the improvement in the grinding process is observed. In fact, after a certain period of service, hollow pits are created in the cellular metal part, which then fill with material to be ground and thus ensure that they play a part in self-protection against wear. This profile advantageously makes it possible to avoid the creation of preferential wear paths by the ground material, reflected in a drop in output rate in the case of the mills. It is noted, moreover, that this structure in the "honeycomb" form according to the second preferred embodiment makes it possible to reduce the risk of propagation of the cracks that could develop in the infiltrated pad during the production of the component. In fact, the splits which might be formed are then closed onto themselves and do not propagate within the whole component.

EXAMPLES

Example 1

Manufacture of an Ejector for a Crusher with a Vertical Shaft

A mixture of 75% of $Al_2O_3$ and 23% of $ZrO_2$ is made up, the two constituents of which are fused by electrofusion to form composite grains of a particle size included in the categories F6 to F20 of the FEPA standard. These grains are then poured into a mould of appropriate shape with a liquid adhesive which, after curing, holds the grains together to form a ceramic pad.

Figure 1:
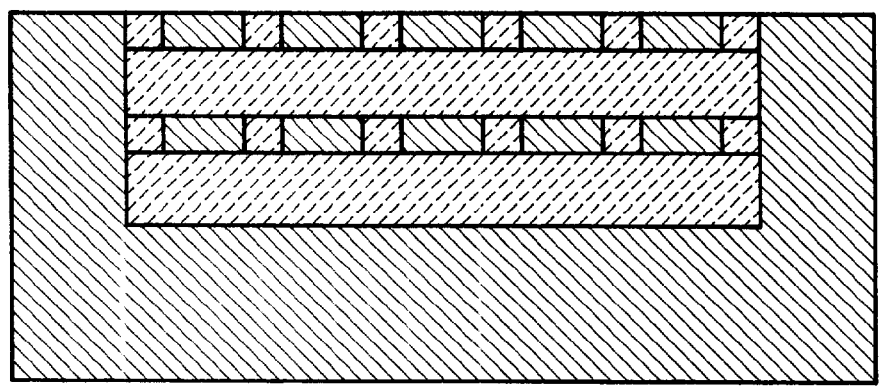
FIG. 1 describes a composite wear component according to a first preferred embodiment of the present invention.

In this particular example it is recommended to employ the configuration shown in FIG. 1, which takes two ceramic pads which are superposed and leaving a 10 mm gap between them. These pads are placed in an appropriate mould, preferably made of sand, into which is next cast a liquid pig iron including 3% of carbon, 26% of chromium and other conventional elements in a small proportion which is always encountered in alloys of this type. A wear component is thus produced with ceramic inserts with a hardness of the order of 1600 Hv with an expansion coefficient close to $8\times10^{-6}$, held in a pig iron matrix with a hardness close to 750 Hv.

Example 2
Manufacture of a Crusher Rotor

The ceramic material is prepared as in Example 1 but this time choosing a composition which gives preference to the expansion coefficient at the expense of hardness, that is to say by taking 40% of $ZrO_2$ and 60% of $Al_2O_3$.

Figure 2A:
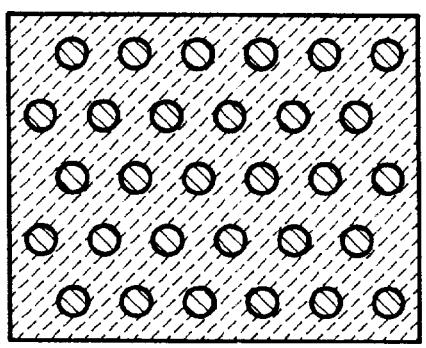
FIGS. 2A and 2B describe a composite wear component according to a second embodiment of the present invention with FIG. 2B being a sectional view taken along line 2B—2B of FIG. 2A.
Figure 2B:
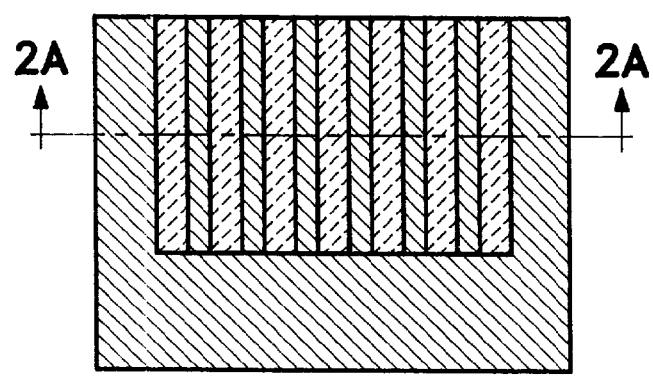

Given that the thickness is particularly considerable in this kind of component, a "honeycomb" form configuration is employed, as shown in FIG. 2. In this case the structure is in the form of a "honeycomb" whose cells have walls the thickness of which is approximately 20 mm and the height of which is practically equal to the height of the composite component. This structure is produced with the aid of a manganese steel with a composition of 1% of carbon, 14% of manganese and 1.5% of molybdenum.

A composite component is thus produced with a hardness of approximately 1350 Hv with an expansion coefficient close to $9\times10^{-6}$. The objective here is to decrease the risk of splits in the component because of the high impact level to which this type of component is subjected.

Example 3
Beater

Figure 3:
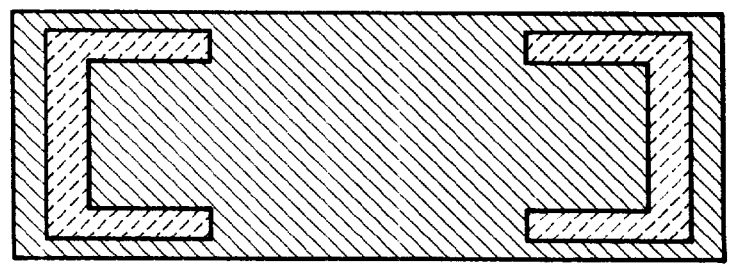
FIG. 3 describes a particular application for a composite wear component according to the present invention.

FIG. 3 shows an example of a ceramic pad employed for an application in beaters, which allows the three wear phases of the beater to be strengthened. The ceramic pad is a single component situated within the metal phase.

What is claimed is:

1. Composite wear component produced by classical or centrifugal casting and consisting of a metal matrix having a working face or faces including inserts which have wear resistance, the inserts consist of a porous ceramic pad, the porous ceramic pad consisting of a homogeneous solid solution of 20 to 80% of $Al_2O_3$ and 80 to 20% of $ZrO_2$, the percentages being expressed by weights of the constituents, and the porous ceramic pad being integrated into the metal matrix by impregnation of a liquid metal in the porous ceramic pad during the casting.

2. Composite wear component according to claim 1, wherein the ceramic material includes from 55 to 60% by weight of $Al_2O_3$ and from 38 to 42% by weight of $ZrO_2$.

3. Composite wear component according to claim 1, wherein the ceramic material includes from 70 to 77% by weight of $Al_2O_3$ and from 23 to 27% by weight of $ZrO_2$.

4. Composite wear component according to claim 1, wherein the content of ceramic materials in the insert is between 35 and 80% by weight.

5. Composite wear component according to claim 1, wherein the inserts consist of an aggregate of composite ceramic grains which have a particle size within the range F6 to F22 according to the FEPA standard.

6. Composite wear component according to claim 1, wherein the ceramic grains are manufactured by one of electrofusion, sintering and flame spraying.

7. Composite wear component according to claim 1, wherein the ceramic grains are joined integrally with the aid of an inorganic or organic liquid adhesive prior to the casting with the liquid metal with a view to the production of the ceramic pad.

8. Composite wear component according to claim 7, wherein the pad does not contain more than 4% of adhesive.

9. Composite wear component produced by casting and composed of a metal matrix including at least one ceramic pad, and at least two ceramic pads are placed side by side, leaving a gap of the order of 10 mm in order to permit the arrival of the liquid metal.

10. Composite wear component produced by classical or centrifugal casting according to claim 1 and made up of a metal matrix including a wear-resistant ceramic pad, the ceramic pad is in the form of a honeycomb structure in which the various cells are of polygonal or circular shape within the ceramic phase.

11. Composite wear component according to claim 10, wherein a thickness of walls of the various cells constituting the ceramic phase varies from 5 to 25 mm.

* * * * *